United States Patent
Mahajan

(10) Patent No.: US 10,263,927 B2
(45) Date of Patent: Apr. 16, 2019

(54) DECLUTTERING GENERAL COMMUNICATION MESSAGE FOR SPECIFIC AUDIENCE

(71) Applicant: International Business Machines Corporation, Armonk, NY (US)

(72) Inventor: Sachin Mahajan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 14/961,926

(22) Filed: Dec. 8, 2015

(65) Prior Publication Data

US 2017/0163595 A1 Jun. 8, 2017

(51) Int. Cl.
*H04L 12/58* (2006.01)

(52) U.S. Cl.
CPC ............ *H04L 51/10* (2013.01); *H04L 51/063* (2013.01)

(58) Field of Classification Search
CPC .............................. H04L 51/10; H04L 51/063
See application file for complete search history.

(56) References Cited

U.S. PATENT DOCUMENTS

| | | |
|---|---|---|
| 6,192,396 B1 | 2/2001 | Kohler |
| 6,529,942 B1 | 3/2003 | Gilbert |
| 6,816,887 B1 | 11/2004 | Shaw et al. |
| 7,730,139 B2 | 6/2010 | Worthington |
| 8,185,591 B1 | 5/2012 | Lewis |
| 8,375,082 B2 | 2/2013 | Mukherjee |
| 8,467,500 B2 | 6/2013 | Hidajat |
| 8,543,656 B2 | 9/2013 | Khoo |
| 8,682,529 B1 | 3/2014 | Church et al. |
| 8,788,593 B1 | 7/2014 | Tong et al. |
| 8,799,379 B1 | 8/2014 | Liden et al. |
| 8,826,148 B2 | 9/2014 | Yuniardi et al. |
| 8,935,344 B2 | 1/2015 | Mayala et al. |
| 9,124,641 B2 | 9/2015 | Baskaran |
| 9,241,069 B2 | 1/2016 | Mohler |
| 9,361,602 B1* | 6/2016 | Hodges .................. G06Q 10/10 |
| 9,774,561 B1* | 9/2017 | Rapp ..................... H04L 12/185 |
| 2004/0078595 A1 | 4/2004 | Kent, Jr. et al. |

(Continued)

FOREIGN PATENT DOCUMENTS

WO 2002035401 A1 5/2002

OTHER PUBLICATIONS

Lorenz et al., "Communicating an E-Mail From a Sender to a Plurality of Recipients" U.S. Appl. No. 14/961,932, filed Dec. 8, 2015.

(Continued)

*Primary Examiner* — Wing F Chan
*Assistant Examiner* — Billy H Ng
(74) *Attorney, Agent, or Firm* — Nolan M. Lawrence

(57) ABSTRACT

A communication system obtains a message intended for one or more recipients. The message contains one or more content elements. The communication system determines, based on the message, a first recipient of the one or more recipients. The communication system detects a first content tag associated with a first content element of the one or more content elements. The communication system alters the first content element based on the first recipient and the first content tag.

15 Claims, 4 Drawing Sheets

(56) References Cited

U.S. PATENT DOCUMENTS

| | | |
|---|---|---|
| 2004/0172451 A1* | 9/2004 | Biggs ................ G06F 17/30017 |
| | | 709/206 |
| 2006/0230275 A1 | 10/2006 | Olivier |
| 2007/0106736 A1 | 5/2007 | Shepherd |
| 2007/0168450 A1* | 7/2007 | Prajapat ................ G06F 17/289 |
| | | 709/207 |
| 2007/0299926 A1 | 12/2007 | Malik |
| 2008/0222257 A1 | 9/2008 | Mukherjee et al. |
| 2010/0125478 A1 | 5/2010 | Bisht |
| 2012/0124143 A1 | 5/2012 | Chung et al. |
| 2012/0300932 A1 | 11/2012 | Cambridge et al. |
| 2013/0080554 A1 | 3/2013 | Addante |
| 2013/0346510 A1 | 12/2013 | Mohit et al. |
| 2014/0096033 A1* | 4/2014 | Blair ........................ G06F 3/01 |
| | | 715/752 |
| 2014/0143358 A1* | 5/2014 | Beausoleil .............. H04L 51/22 |
| | | 709/206 |
| 2014/0222702 A1 | 8/2014 | Jennings |
| 2015/0012598 A1 | 1/2015 | Klimt et al. |
| 2015/0156220 A1 | 6/2015 | Baskaran |
| 2017/0078234 A1* | 3/2017 | Massand ................ H04L 51/08 |

OTHER PUBLICATIONS

List of IBM Patents or Patent Applications Treated as Related, Dec. 4, 2015, 2 pages.
WhatIs.com, definition of e-mail, Jul. 18, 2015, 2 pages.
ATIS Telecom Glossary, definition of e-mail, Mar. 13, 2013, 1 page.

* cited by examiner

DECLUTTERING GENERAL COMMUNICATION MESSAGE FOR SPECIFIC AUDIENCE

BACKGROUND

The present disclosure relates to altering messages, more particular aspects relate to customizing a communication message to declutter content and increase user comprehension.

Communication systems allow users to create and share information together. Communication systems may enable collaboration between distant users to convey and articulate ideas. Communication systems may be used in the retail industry to increase the marketability and quality of products. Communication systems may be utilized by governments to effectively disseminate ideas and policies. Communication systems may be utilized by medical professionals for education and research. Communication systems may be utilized by people to plan events and share photos.

SUMMARY

Embodiments of the present disclosure include a method, computer program product, and system for decluttering communication in a collaborative environment. A communication system obtains a message intended for one or more recipients. The message contains one or more content elements. The communication system determines, based on the message, a first recipient of the one or more recipients. The communication system detects a first content tag associated with a first content element of the one or more content elements. The communication system alters the first content element based on the first recipient and the first content tag.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
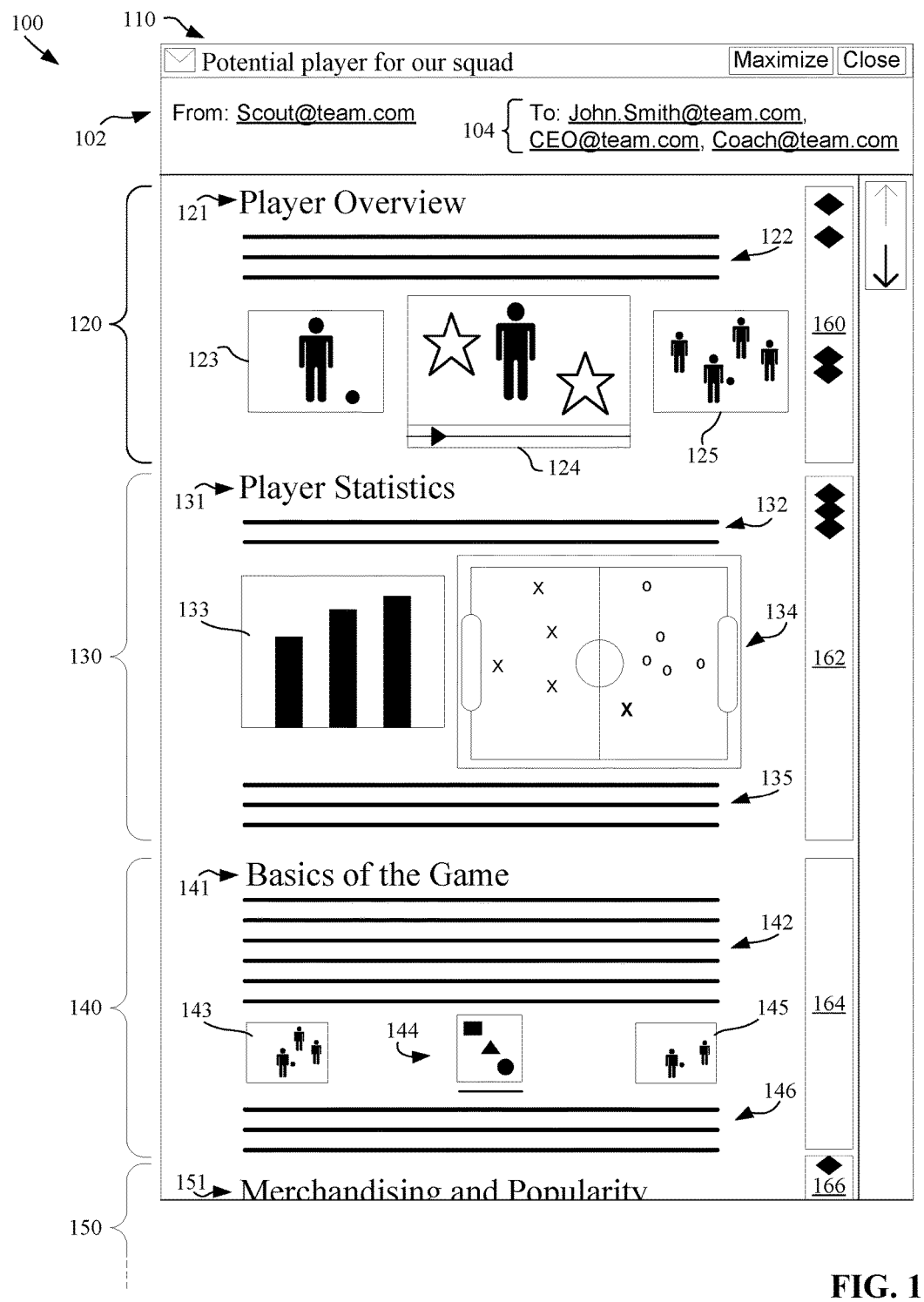
FIG. 1 depicts an email to be customized consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to altering messages, more particular aspects relate to customizing a communication message to declutter content and increase user comprehension. While the present disclosure is not necessarily limited to such applications, various aspects of the disclosure may be appreciated through a discussion of various examples using this context.

Users may increasingly collaborate and communicate with each other through a communication system (e.g., email clients connected into a business intranet, Internet-based collaboration tools, messaging clients). A communication system may include one or more primary programs (e.g., clients and servers) utilizing a network connection (e.g., the Internet) to share information amongst many users in the form of one or more messages (e.g., emails). Each message may contain one or more static content elements (elements), such as text. Increasingly, the elements may take a variety of forms, such as images, videos, documents, hyperlinks, and spreadsheets. The elements may be associated with one or more secondary programs (e.g., text document viewers, image viewers, spreadsheet programs, web-browsers, etc.).

A user may create the message through a client (e.g., an email client) and may pour significant time into the message's creation. The message may become extremely lengthy and specific, such as when a user is a member of a large organization. The user may need to provide many elements in a message, the elements touching on a variety of topics. The user may also be sending the message to a sizeable number of recipients. Each of the recipients may have varying levels of knowledge regarding the subject matter of the message, or varying amounts of time and attention span to read and understand the message.

A message decluttering system (MDS) may customize one or more content elements of a message (e.g., an email, a wiki article, a collaborative computing tool, etc.) for one or more recipients. The MDS may include a client utilized by the sender to generate a message that is altered for multiple recipients. In some embodiments, the MDS includes two or more clients utilized by a sender and a recipient, respectively. The clients may be software applications (e.g., email clients, web-browsers connected to a web-based collaboration tool, etc.). In some embodiments, the MDS may additionally comprise additional services running on one or more servers. The clients and servers may run (execute) on one or more computer systems, such as a computer system depicted in FIG. 4.

The MDS may enable a sender to create a single message and have the content of the message be intended for one or more recipients. A sender may utilize the MDS by creating a single message. The sender my address the message to one or more recipients. The message may contain one or more content elements, such as text and videos. The sender may associate tags (e.g., highlight certain elements, enter metadata about certain elements) with some of the content elements. In some embodiments, the MDS may associate tags with each of the content elements. The tags may also be associated with one or more recipients or a group of recipients. The MDS may customize the message for each recipient based on the tags and the recipients.

To apply tags to content elements, the sender may utilize a client (e.g., an email client). For example, the sender may select content she previously entered into the client. The sender may select the entered content with a client device that is running the client (e.g., using a mouse to double click on entered text, using a keyboard to select an entered spreadsheet, using her finger on a touchscreen, etc.). The sender may then enter a tag command to indicate the creation of a tag regarding the entered content (e.g., right clicking on an image, hitting a key command on the keyboard while a video is selected, etc.). The MDS may provide, in response to the entered tag command, a tag interface to the sender. The sender may enter information regarding the entered content using the tag interface (e.g., typing descriptive information regarding an image to provide categorical information; selecting additional content, either in the MDS or from an outside source, to associate with a segment of text; etc.).

The MDS may store the tags as well as the associations to the entered content in the message. The MDS may store the tags as well as the associations to the entered content separately from the message. The sender may also create tags associating the entered content with one or more recipients in a similar manner (e.g., entering commands through input devices and selecting recipients the sender wants to associate from an interface provided by the client). Applied tags may be indicated through the sender's client through slight alterations to the entered content. For example, the entered content that the sender tagged may have a visually different look to it (e.g., highlighting, font changes, case or capitalization changes, etc.). In some embodiments, the tags may be indicated with symbols displayed in proximity of the entered content (e.g., stars, diamonds, flag shapes, etc.). If the user wants to modify or remove an existing tag, the user may interact with the tags using the client (e.g., clicking on the stars with a mouse, touching a flag shape displayed on a touchscreen with a finger, etc.).

The tags may categorize the content elements. The categorization may be related to the subject matter. The categorization may be related to the depth of knowledge required to understand the content elements. The categorization may relate to the quality of the content elements, such as two pictures that convey similar information but one picture may be of a higher quality. The categorization may relate to the time required to read or comprehend the content elements. The categorization may relate a first content element to a second content element (e.g., a first content element describes and provides context to further understand a second content element). In some embodiments, the categorization may relate to parts within a content element. For example, a first content element may be some text and a set of pictures, and the categorization may be that the text is a heading that describes the set of pictures.

The MDS may also monitor the recipients to determine additional tags that relate to preferences of the recipients. The MDS may monitor utilizing a smart declutter service (service) running on one or more servers, on one or more of the clients, or both. The service may take explicit input from the sender and the recipients (e.g., the recipients setting preferences about the type of content they prefer, the type of content they wish to see less of, etc.). The service may also implicitly gather input from the sender and the recipients (e.g., monitoring how often a recipient looks at a certain type of content, gathering organizational information from a user from organizational data-records, etc.). The smart declutter service will take the gathered input and generate additional tags that are related to the sender and the recipients. The mart declutter service may retain the tags so that future messages may be altered and decluttered using the sender/recipient-related tags.

The MDS may alter the content elements of the message based on the associated tags and based on the recipients. For example, a message with a first content element may have an associated tag that relates to a role, and the MDS may alter the message for any recipient related to that role. The MDS may alter the content elements based on the recipients. For example, a first recipient may typically look at every content element of any received communication, and the MDS may alter the message by including all content elements. A second recipient may only skim through received communications, and the MDS may alter the message by including only content elements with a higher priority tag. The MDS may alter the content elements based on the relationship between the sender and the recipients (e.g., a recipient having a higher degree of experience than a sender, a sender being a manager of a recipient, etc.). In embodiments where a content element has multiple parts, the MDS may customize the message by altering the parts (e.g., rearranging, hiding, resizing, etc.) of the content element.

FIG. 1 depicts an email 100 to be customized consistent with embodiments of the present disclosure. The email 100 may be described through an example sports team scenario (e.g., professional football, college basketball, etc.). The email 100 may be created by a sender 102 and may be sent to a plurality of recipients 104. The sender 102 may be a scout for the team and may be crafting the email 100 with a variety of topics related to a potential player that the team may try to acquire. The sender 102 may create the email 100 from a client device (e.g., desktop email software) of an MDS. The client device of the MDS may provide the sender 102 with the ability to enter content and to tag the content (e.g., enter meta-data, define relationships, categorize content, etc.).

The email 100 may include the following: a title 110 describing the general subject-matter of the email; a first topic 120; a second topic 130; a third topic 140; a fourth topic 150; a first tag interface 160 for the first topic; a second tag interface 162 for the second topic; a third tag interface 164 for the third topic; and a fourth tag interface 166 for the fourth topic. The first topic 120 may include first content elements 121, 122, 123, 124, and 125. The second topic 130 may include second content elements 131, 132, 133, 134, and 135. The third topic 140 may include third content elements 141, 142, 143, 144, 145, and 146. The fourth topic 150 may include a fourth content element 151 and additional fourth content elements (not depicted).

The tag interfaces 160 to 166, may provide the sender 102 with a way to create tags for the content elements and topics. For example, the first tag interface 160 may be a user interface element that displays a listing of tags that have been created for the first topic 120. The first tag interface 160 may also display additional interface elements for the creation of additional tags for the first topic. The first tag interface 160 may also display interface elements for the creation of new topics. The first tag interface 160 may be displayed upon creation of the email 100. The sender 102 may utilize the tag interfaces 160 to 166 directly (e.g., by clicking on one of the interface elements of the tag interfaces) to create and modify tags. The sender 102 may utilize the tag interfaces 160 to 166 indirectly. For example, the sender 102 may click on content elements or topics directly to create tags, and upon tag creation the tag interfaces 160 to 166 may update to indicate the creation of the tags.

The first topic 120 may include general information about the potential player. The sender 102 may type information about the potential player not including statistically relevant information, such as hometown and career goals. The provided information may include the first content elements 121 to 125. The sender 102 may tag first content elements 121 to 125 as intended for every member of the team organization. First content element 121 may be a heading of the first topic 120. First content element 122 may be a paragraph of general player information entered by the sender 102. The sender 102 may also generate a summary (not depicted) of first content element 122. The sender 102 may tag the summary and first content element 122 as substitutable for each other. First content element 123 may be a bio picture of the potential player created by a marketing company. First content element 124 may be an interview video that the potential player created to describe his capabilities and eagerness to join the team. First content element 125 may be a photo of the potential player performing an advanced technique during a pivotal game. The sender 102 may tag first content element 125 as intended for recipients with an advanced understanding of the sport. The sender 102 may also tag first content element 125 as a high priority content element.

The second topic 130 may include advanced player statistical information of the potential player. The sender 102 may create the statistical information about the potential player through research. The statistical information may be conveyed through second content elements 131 to 135. The sender 102 may tag the second content elements 131 to 135 as intended for a coaching subset of the team organization. The sender 102 may also tag the second content elements 131 to 135 as more advanced in technical nature. Second content element 131 may be a heading of the second topic 130. Second content element 132 may be a paragraph theorizing whether the potential player would be a good fit for the team. Second content element 133 may be a graph showing attributes of the potential player against other players already on the team. Second content element 134 may be a diagram depicting a particular strategy that may be employed with the potential player. Second content element 135 may be a paragraph related to second content element 132. Second content element 135 may provide additional text that outlines why the scout believes the potential player would be beneficial from a statistical point of view. The sender 102 may also tag the content elements 131 to 135 as strictly ordered.

The third topic 140 may include basic information about playing the game. The sender 102 may generate the third topic 140 by writing some information and also copying additional information from predetermined resources (e.g., rulebooks, encyclopedias, team strategy guides, etc.). Third content element 141 may be a heading of the third topic 140. Third content element 142 may be several paragraphs that contain information regarding the game and may include multiple examples and definitions of basic terms. Third content element 143 may be a photograph of the team in an initial formation. Third content element 144 may be an attachment to be displayed by an external program (e.g., a presentation file to be displayed in a slideshow-based presentation program). Third content element 145 may be a photograph of the team in a subsequent formation. Third content element 143 and third content element 145 may have meta-data or filename similarities or may retrieved, by the sender 102, from the same directory of a file system.

The fourth topic 150 may include merchandising information and popularity statistics. Fourth content element 151 may be a heading describing the fourth topic 150. The fourth topic 150 may include other fourth content elements (not depicted). The sender 102 may tag the fourth topic 150 as intended for a managerial subset of the team organization.

Figure 2A:
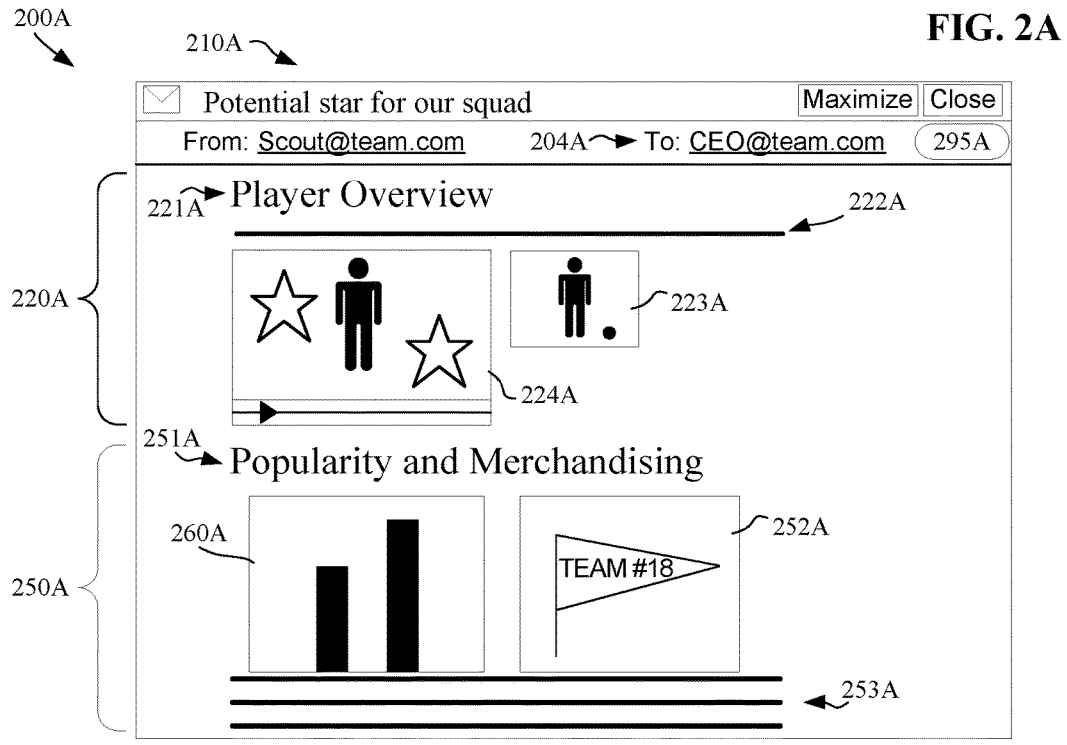
FIG. 2A depicts an altered email, customized for a first user consistent with embodiments of the present disclosure.

FIG. 2A depicts an altered email 200A, customized for a first user consistent with embodiments of the present disclosure. The altered email 200A (email) may be described through a continuation of the example sports team scenario described in FIG. 1. The email 200A may be customized by the MDS (the MDS utilized by sender 102 to draft the email 100). The email 200A may be sent to a recipient 204A. The recipient 204A may be an executive of the sports team. The recipient 204A may be utilizing a second client (e.g., mobile email software) of the MDS. The second client of the MDS may provide the customized email 200A based on a number of factors, including any of the following: the content of the email 100; the tags placed into the email by the sender 102; the recipient 204A of the email; and the sender of the email.

The email 200A may include a title 210A, a first topic 220A, and a second topic 250A. It should be appreciated that reference numbers of FIG. 2A may correspond to reference numbers of FIG. 1. The title 210A may be a customized version of title 110. The first topic 220A may be a customized version of first topic 120. The first topic 220A may include first content elements 221A, 222A, 223A, and 224A. The second topic 250A may be a customized version of fourth topic 150. The second topic 250A may include second content elements 251A, 252A, 253A, and 260A. In some embodiments, the email 200A may also include an interface element 295A for modifying the alterations and customizations of email 100. The visibility of interface element 295A may be based on a privilege level of the recipient 204A, or based on one or more tags created by the sender 102. The recipient 204A may interact with the interface element 295A to reverse the customizations performed by the MDS, to view email 100 (rather than customized email 200A).

The first topic 220A may include the general information provided by the sender 102. The provided information may include first content elements 221A to 224A. First content element 221A may be an unaltered version of first content element 121. First content element 222A may be an altered version of first content element 122. The MDS may alter, based on an existing tag, first content element 122 by replacing it with the summary written by the sender 100. The MDS may use first content element 222A because the executive has explicitly set a preference for shorter emails. First content element 223A may be a resized version of first content element 123. First content element 224A may be a resized version of first content element 124. First content elements 223A and 224A may be in a different arrangement than first content elements 123 and 124. The MDS may make size adjustments and rearrangements based upon past usage of the second client by the recipient 204A. For example, the executive may only look at videos first and so the MDS may place the video (first content element 224A) of the potential player in front of all other content. The MDS may also customize first topic 220A by hiding first content element 125. The MDS may hide first content element 125 because of a combination of a tag created by the sender 102 and an experience level of the recipient 204A.

The second topic 250A may include the merchandising information and popularity statistics created by the sender 102 and may be customized by the MDS. The second topic 250A may be a customized version of the fourth topic 150. The provided information may include second content elements 251A, 252A, 253A, and 260A. Second content element 251A may be an altered version of fourth content element 151. Second content element 252A may be an altered version of a fourth content element not depicted in FIG. 1. The MDS may have taken a stock merchandise item and may have inserted the potential player's number for clarity. Second content element 253A may be an unaltered version of a fourth content element not depicted in FIG. 1. Second content elements 251A, 252A, and 253A may have been added to email 100 from the sender 102 by the MDS. Second content element 260A may be a graph showing the popularity of the potential player from an online resource (e.g., a website on the Internet). The MDS may have retrieved second content element 260A, in addition to rearranging and/or altering second content elements 251A, 252A, and 253A.

Figure 2B:
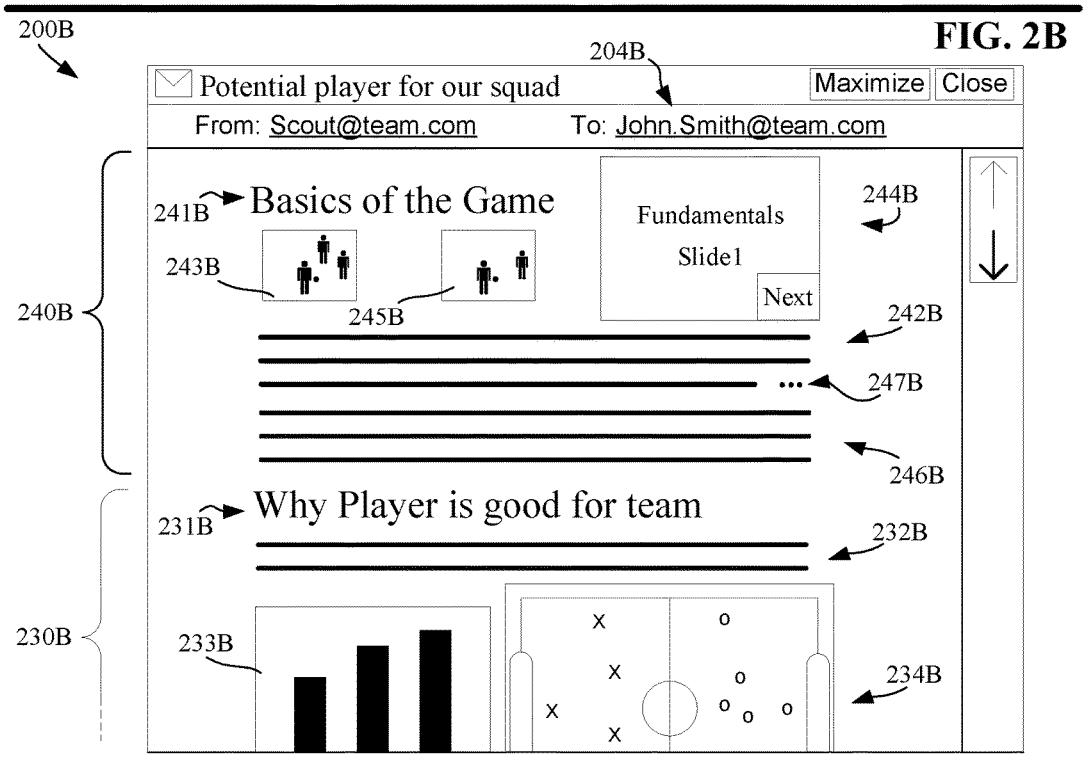
FIG. 2B depicts an altered email, customized for a second user consistent with embodiments of the present disclosure.

FIG. 2B depicts an altered email 200B, customized for a second user consistent with embodiments of the present disclosure. The altered email 200B (email) may be described through a continuation of the example sports team scenario described in FIG. 1. The email 200B may be customized by the MDS (the same MDS utilized by the sender 102 to draft the email 100). The email 200B may be sent to a recipient 204B. The recipient 204B may be a new employee of the sports team that reports to the sender 102. The recipient 204B may be utilizing a third client (e.g., a web-based email through an Internet web-browser). The third client of the MDS may provide the customized email 200B based on a number of factors, including any of the following: the content of the email 100; previous emails sent to the new employee; the tags placed into the email by the sender 102; the recipient 204B of the email; and the sender of the email.

The email 200B may include a first topic 240B, a second topic 230B, and a third topic (not depicted). It should be appreciated that reference numbers of FIG. 2B may correspond to reference numbers of FIG. 1. The first topic 240B may include first content elements 241B, 242B, 243B, 244B, 245B, 246B, and 247B. The second topic 230B may include second content elements 231B, 232B, 233B, and 234B. The third topic may include one or more third content elements (not depicted). The third content elements may be the same as or similar to those found in the first subject 120 of email 100. In some embodiments, the MDS may alter or customize the third content elements. The arrangement of the first topic 240B, the second topic 230B, and the third topic may be different from the corresponding arrangement of corresponding topics in email 100. This rearrangement of topics may be based on the experience level of the new employee.

The first topic 240B may include the basic information about the game as provided by the sender 102. The basic information may include first content elements 241B to 247B. First content element 241B may be an unaltered version of third content element 141. First content element 242B may be a shortened version of third content element 142. First content element 247B may be arranged near first content element 242B. First content element 247B may indicate to the recipient 204B that first content element 242B is in a shortened form. In some embodiments, first content element 247B may also be an interactive link (e.g., a hyperlink) to additional content. First content element 246B may be an unaltered version of third content element 146. First content element 243B may be a resized version of third content element 143. First content element 245B may be a resized version of third content element 145. First content element 244B may be an inline slideshow presentation of the attached file of third content element 144. The MDS may provide first content element 244B within the email 200B such that the recipient 204B need not leave the third client to view the slideshow presentation. The MDS may rearrange the third topic 140 when generating the layout of first topic 240B. The rearrangement may be based on the learning style of recipient 240B (e.g., a visual learner may learn better by having images before text).

The second topic 230B may include the statistical information of the potential player provided by the sender 102. The second topic 230B may be placed after the first topic 240B based on one or more tags provided by the sender 102. The second topic 230B may include the second content elements 231B to 234B, as well as additional content elements (not depicted). Second content element 231B may be an altered version of second content element 131. Second content element 231B may be altered to tie into the first topic 240B. Second content elements 232B to 234B may be unaltered versions of second content elements 132 to 134, respectively.

Figure 3:
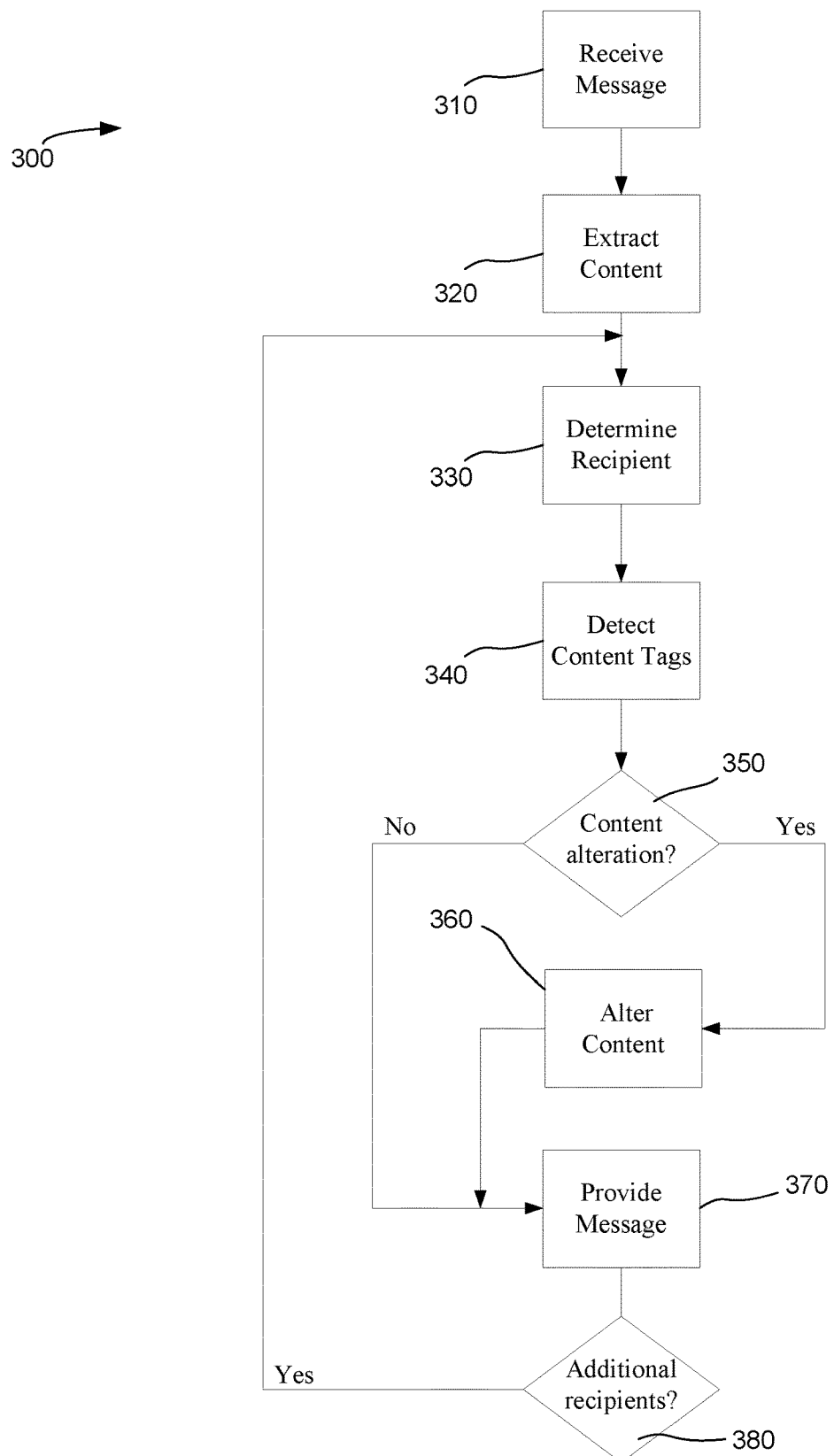
FIG. 3 depicts a method for altering a message based on recipients and content tags consistent with embodiments of the present disclosure.

FIG. 3 depicts a method 300 for altering a message based on recipients and content tags consistent with embodiments of the present disclosure. Method 300 may be performed by one or more components of an MDS. The MDS may include the following: a first client operated by a sender (sender client) to compose a message; one or more second clients operated by one or more recipients (recipient clients); and (optionally) a content server (server) to handle message transfer and customization.

Per operation 310, the message may be received by the MDS. In some embodiments, the MDS may receive the message by retrieving it from a server, such as an email server of an Internet service provider. The message may include various content elements (e.g., pictures, text, animations, attached files, etc.). The various content elements may be arranged in a particular order and may have a particular theme or style applied (e.g., bold text, fixed display size pictures, etc.). The message may include one or more embedded tags associated with the various content elements. The tags may be metadata describing the content elements, the recipients, the sender or any combination thereof. Per operation 320, the MDS may extract the content of the message.

Per operation 330, the MDS may also determine a recipient of the message. The recipient may be listed by specific name, such as John Smith. The recipient may be determined (per operation 330) from a group that the message is address to (e.g., a message sent to all administrators). The MDS may also determine the recipient from a recipient data-source, such as a database containing the names of recipients and one or more corresponding attributes. Per operation 340, the MDS may detect one or more content tags. The content tags may be the embedded tags associated with the various content elements of the message, such as the rating of various segments of text in the message. The content tags may be in the corresponding attributes of the determined recipient (e.g., a specific person dislikes viewing multiple images in a message). The content tags may also be stored within the MDS, such as rules governing the size of a message at certain times of day.

Per operation 350 and based on the determined recipient (per 330), the MDS may decide to alter the content elements of the message. The MDS may also make the decision (per operation 350) based on the detected content tags (per 340). If the MDS decides to alter the content elements (per 350), the content may be altered (per operation 360). The content alteration (per 360), may include any of the following: inserting new content elements; rearranging the order of existing content elements; modifying the actual content of the content elements; removing part or all of a content element; and changing the particular theme or style of the content elements. The content alteration (per 360) may include taking a part of a first content element and placing it into a second content element (e.g., a few words from a first body of text is removed and placed into a second body of text). The alteration of content (per 360) may be directed towards the determined recipient (e.g., a message for a more knowledgeable party may include a summarization of content elements considered basic knowledge).

If the MDS decides not to alter the content elements (per 350) based on the determined recipient (or, per 360, after the content alteration), the message may be provided to the determined recipient (per operation 370). After providing the message to the determined recipient (per 370), the MDS may decide if the message was directed to additional recipients (per operation 380). If the message is directed to additional recipients (per 380), the MDS may again determine a recipient of the message (per 33). If the message is not directed to additional recipients (per 380), method 300 may end.

Figure 4:
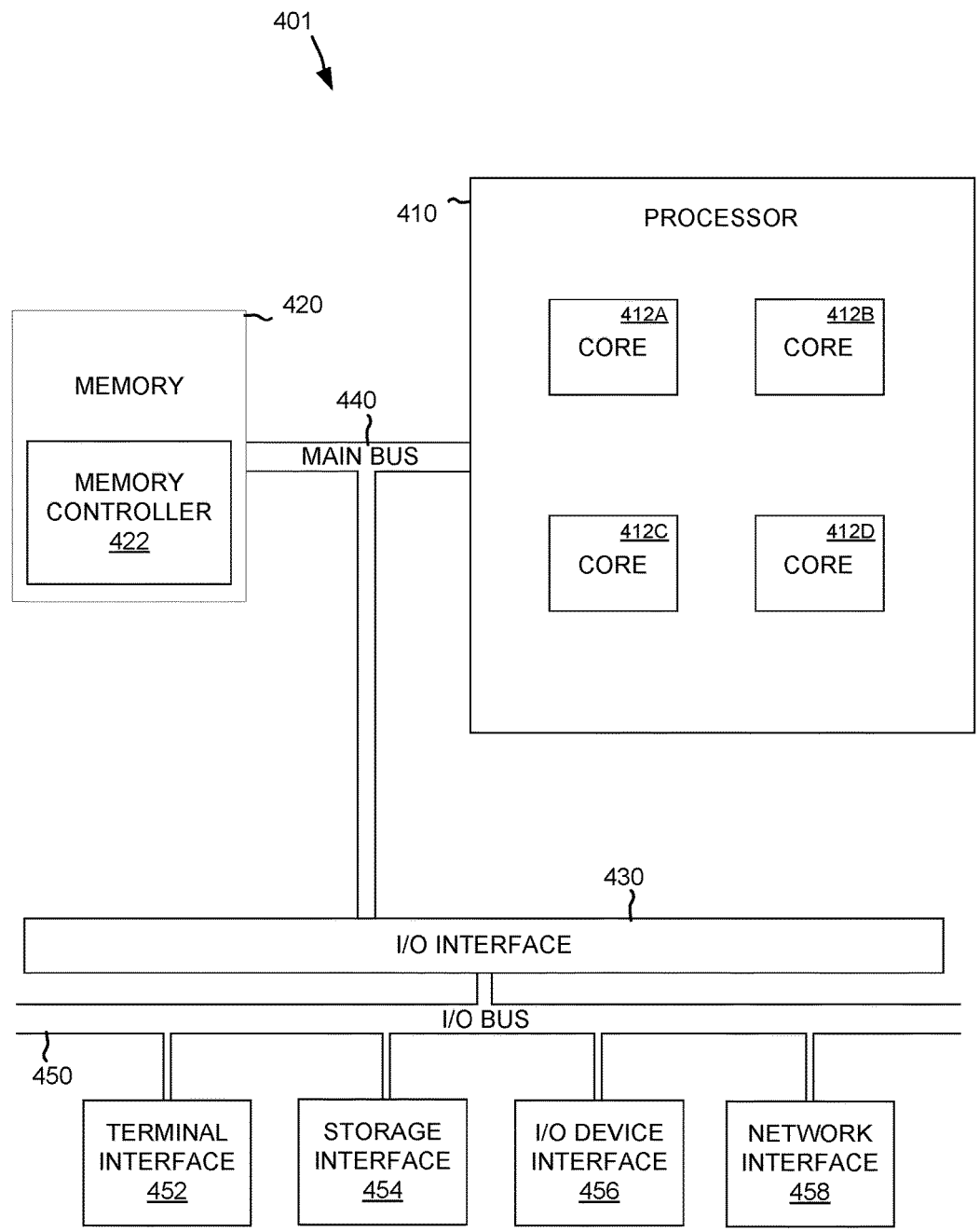
FIG. 4 depicts the representative major components of an example computer system consistent with embodiments of the present disclosure.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for decluttering communication in a collaborative environment, the method comprising:
    obtaining, by a communication system, a message intended for one or more recipients, wherein the message contains a body of a plurality of content elements, and wherein the message also contains a title and a sender field and a recipient field,
        wherein the body of the plurality of content elements is in a first language,
        wherein the message was generated by a single user at a first time;
    determining, by the communication system and based on the message, a first recipient of the one or more recipients;
    detecting, by the communication system, a first content tag associated with a first content element of the plurality of content elements of the body of the message; and
    altering, by the communication system and based on the first recipient and based on the first content tag, the first content element, wherein the altered content element is also in the first language, wherein the altering is rearranging an order of the first content element in relation to the plurality of content elements of the body of the message.

2. The method of claim 1, wherein the communication system is an email client.

3. The method of claim 1 wherein the one or more recipients are two or more recipients, and wherein the method further comprising:
    determining, by the communication system and based on the message, a second recipient of the two or more recipients;
    detecting, by the communication system, a second content tag associated with the first content element of the plurality of content elements of the body of the message;

altering, by the communication system and based on the second recipient and based on the second content tag, the first content element.

4. The method of claim 3, wherein the first content tag and the second content tag are the same.

5. The method of claim 1, wherein the altering is emphasizing the first content element.

6. The method of claim 1, wherein the altering is enlarging the first content element.

7. The method of claim 1, wherein the altering is shrinking the first content element.

8. The method of claim 1, wherein the first content tag is placed explicitly into the message by a sender of the message.

9. The method of claim 1, wherein the first content tag is not associated with the first recipient, and wherein the altering is removing the first content element.

10. The method of claim 1, wherein the first content tag is associated with a first group of users, and wherein the first recipient is one of the first group of users.

11. A system for decluttering communication in a collaborative environment, the system comprising:
   a memory; and
   a processor in communication with the memory, wherein the processor is configured to perform a method comprising:
      obtaining a message intended for one or more recipients, wherein the message contains a body of a plurality of content elements, and wherein the message also contains a title and a from address and a to address, wherein the message was generated by a single user at a first time;
      determining, based on the message, a first recipient of the one or more recipients;
      detecting a first content tag associated with a first content element of the plurality of content elements of the body of the message; and
      altering, based on the first recipient and based on the first content tag, the first content element, wherein the altering maintains the language of the message before the alteration, and wherein the altering is rearranging an order of the first content element in relation to the plurality of content elements of the body of the message.

12. The system of claim 11, wherein the altering is emphasizing the first content element.

13. A computer program product comprising a computer readable storage medium having program instructions embodied therewith, the program instructions executable by a computer to cause the computer to perform a method comprising:
   obtaining, by a communication system, a message intended for one or more recipients, wherein the message contains a body of a plurality of content elements, and wherein the message also contains a title and a sender and a recipient, wherein the message was generated by a single user at a first time;
   determining, by the communication system and based on the message, a first recipient of the one or more recipients;
   detecting, by the communication system, a first content tag associated with a first content element of the plurality of content elements of the body of the message; and
   altering, by the communication system and based on the first recipient and based on the first content tag and by maintaining the language of the message, the first content element and wherein the altering is rearranging an order of the first content element in relation to the plurality of content elements of the body of the message.

14. The computer program product of claim 13, wherein the altering is emphasizing the first content element.

15. The computer program product of claim 13, wherein the altering is enlarging the first content element.

* * * * *